(12) United States Patent
Fujita et al.

(10) Patent No.: US 8,025,946 B2
(45) Date of Patent: Sep. 27, 2011

(54) VIBRATION-WELDED STRUCTURE

(75) Inventors: Kyo Fujita, Saitama (JP); Minoru Kaneko, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 255 days.

(21) Appl. No.: 12/310,533

(22) PCT Filed: May 7, 2008

(86) PCT No.: PCT/JP2008/058467
§ 371 (c)(1),
(2), (4) Date: Feb. 27, 2009

(87) PCT Pub. No.: WO2008/142987
PCT Pub. Date: Nov. 27, 2008

(65) Prior Publication Data
US 2010/0239813 A1 Sep. 23, 2010

(30) Foreign Application Priority Data
May 16, 2007 (JP) .................................. 2007-130269

(51) Int. Cl.
*B32B 3/06* (2006.01)
(52) U.S. Cl. ........................................ 428/58; 156/73.5

(58) Field of Classification Search ............... 428/58; 156/73.5, 73.6; 403/270
See application file for complete search history.

(56) References Cited

U.S. PATENT DOCUMENTS

| 7,320,820 B2 * | 1/2008 | Shiono ............................ 428/57 |
| 2006/0068161 A1 | 3/2006 | Enokida et al. |

FOREIGN PATENT DOCUMENTS

| DE | 10 2005 046 137 | 4/2006 |
| JP | 11-42709 | 2/1999 |
| JP | 2005-35067 | 2/2005 |
| JP | 2006-95730 | 4/2006 |
| JP | 2006-218822 | 8/2006 |

OTHER PUBLICATIONS

International Search Report issued Jul. 15, 2008 in the International (PCT) Application of which the present application is the U.S. National Stage.

\* cited by examiner

*Primary Examiner* — Alexander Thomas
(74) *Attorney, Agent, or Firm* — Wenderoth, Lind & Ponack, L.L.P.

(57) ABSTRACT

A vibration-welded structure includes a welding rib having a weld surface, which is provided on each of two parts to be welded with each other. At least one guide portion is provided on one of the two parts, and the at least one guide portion is capable of guiding a movement of the welding rib of the other of the two parts in a vibration direction.

13 Claims, 2 Drawing Sheets

VIBRATION-WELDED STRUCTURE

TECHNICAL FIELD

The present invention relates to a vibration-welded structure.

BACKGROUND ART

Various types of resin or plastic parts have been used in a vehicle such as an automobile. As such a resin part, one is known which is joined by performing vibration welding (see, for example, Patent Document 1).

In the vibration welding, for example, as shown in FIG. 3, a first part 1 is provided with a welding rib 3. A welded surface 2 of the welding rib 3 is attached to a general surface 5 of a second part 4 and vibrated (in a vibration direction 6) so that a vicinity of the welded surface 2 is frictionally melted to weld the two parts (welded portion 7).

[Patent Document 1] Japanese Patent Application Publication No. 2006-218822

However, in a vibration-welded structure obtained by the above vibration welding, as shown in FIG. 4, sufficiently large friction can not be obtained if there is an angle between the welded surface 2 and the vibration direction 6. Accordingly, there are problems in that the welding strength decreases so that failure in welding easily occurs. In particular, it becomes impossible to weld the two parts in a case where the angle between the welded surface 2 and the vibration direction 6 becomes large.

SUMMARY OF THE INVENTION

In order to solve the above problems, in a vibration-welded structure of the invention, each of two parts, which are to be joined with each other by vibration welding, is provided with a welding rib having a corresponding weld surface. Each of the welding ribs is provided with a guide portion capable of guiding a movement of the other welding rib in a vibration direction.

DETAILED DESCRIPTION OF THE INVENTION

Embodiments

Embodiments specifically showing the present invention will be explained with reference to the drawings.

Figure 1:
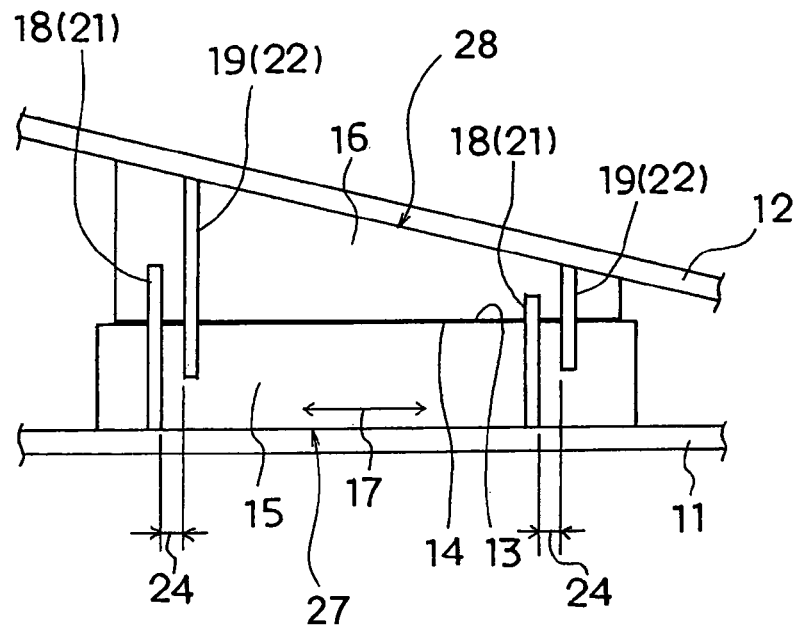
FIG. 1 is a side view of a vibration-welded structure according to an embodiment of the present invention.
Figure 2:
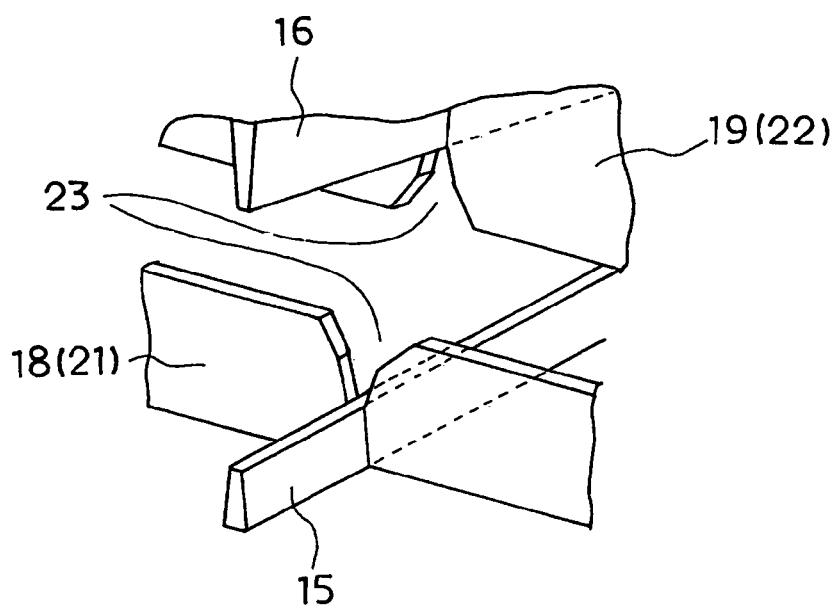
FIG. 2 is a partially-enlarged perspective view of FIG. 1.
Figure 3:
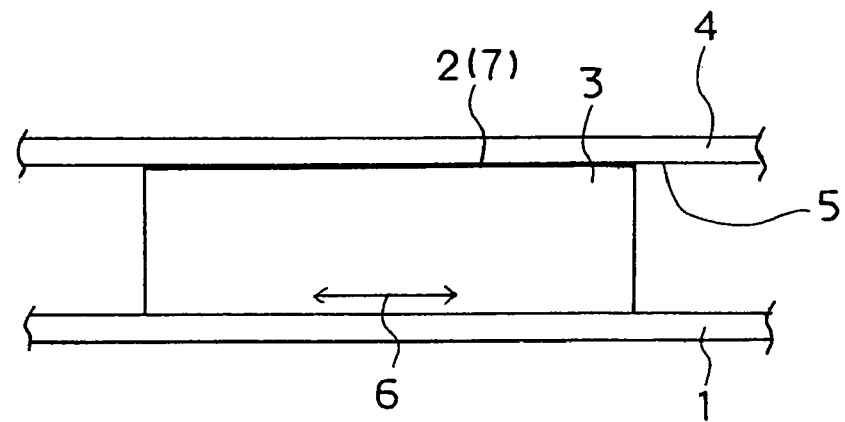
FIG. 3 is a side view of a vibration-welded structure according to a conventional example.
Figure 4:
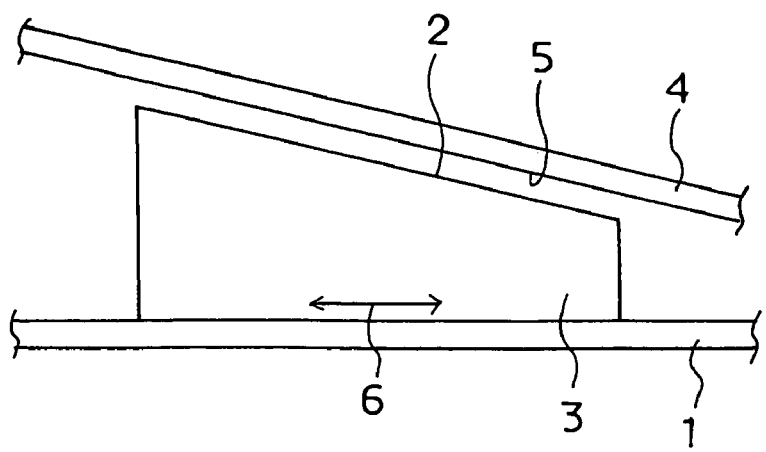
FIG. 4 is a side view illustrating a state in which a welded surface is disposed at an angle with a vibration direction.

FIGS. 1 and 2 show a vibration-welded structure according to an embodiment of the present invention.

First, a configuration of the vibration-welded structure will be explained.

In a vehicle such as an automobile, various types of resin parts are used. As such a resin part, a part which is joined by performing a vibration welding is used.

In this embodiment, as shown in FIGS. 1 and 2, two parts 11, 12, to which the vibration welding is to be applied, are provided with welding ribs 15, 16 having weld surfaces 13, 14 corresponding to each other, respectively.

In this case, the two parts 11, 12 have a comparatively large interval between each other and are inclined at an angle (joined angle) to each other. The welding rib 16 provided on one part 12 of the two parts 11, 12 may have a weld surface 14 parallel to a vibration direction 17 and a part-connecting surface 28 formed at an angle equal to the joined angle in relation to the weld surface 14. It may be possible that each of the welding ribs 15, 16 respectively provided on the two parts has a respective weld surface 13, 14 parallel to the vibration direction 17 and a part-connecting surface 27, 28 having an angle in relation to the weld surface 13, 14, respectively, and the sum of the angles of the part-connecting surfaces 27, 28 of the welding ribs 15, 16 provided on the two parts 11, 12 in relation to the weld surfaces 13, 14, respectively, is equal to the joined angle between the two parts.

Each of the weld surfaces 13, 14 is formed in a linear form along an inclined direction of each of the two parts 11, 12, and the weld surfaces 13, 14 are provided so as to correspond to each other when the two parts 11, 12 are joined. That is, the welding ribs 15, 16 have heights such that the sum of the heights of the welding ribs 15, 16 are approximately equal to an interval between corresponding portions of the two parts 11, 12 when the two parts are joined. Thereby, the height of each of the welding ribs 15, 16 is approximately half of the height of the conventional rib. Although the welding ribs 15, 16 may be formed in a rectangular shape in section, in this case, the welding ribs are formed in a tapered trapezoidal foam in section.

At least one guide portion 18 (19) is provided on at least one of the two parts 11 (12) and is capable of guiding a movement of the welding rib 16 (17) of the other of the two parts 12 (11) in a vibration direction. It is preferable that at least one guide portion be provided on each of the two parts. In this case, the guide portions 18, 19 are provided on the welding ribs 15, 16 and are capable of guiding the movement of the welding ribs 16, 15 at other sides in the vibration direction 17, respectively. In addition, the vibration direction 17 is approximately a longitudinal direction of the weld surfaces 13, 14 (welding ribs 15, 16), which are generally in a linear form. That is, the welding ribs 15, 16 are provided so as to extend in the vibration direction 17.

The guide portions 18, 19 are, for example, guide ribs 21, 22 provided in directions across the corresponding welding ribs 15, 16, respectively. Moreover, although it is possible that the guide portions 18, 19 be other than the guide ribs 21, 22, it is preferable that the guide portions 18, 19 be the guide ribs 21, 22.

The guide ribs 21, 22 are formed so as to extend to both sides and to have heights larger than the heights of the weld surfaces 13, 14, respectively. The guide ribs 21, 22 are integrally provided on the corresponding welding ribs 15, 16. Furthermore, the guide ribs 21, 22 have notch portions 23 for guiding the welding ribs 16, 15 of the other sides at positions of the weld surfaces 13, 14, the positions crossing over the weld surfaces 13, 14, respectively. As illustrated in FIGS. 1 and 2, the guide ribs 21, 22 are generally orthogonal to the welding ribs 15, 16. The notch portion 23 has, for example, a tapered shape having a broad width at an entry (digital) side and a narrow width at a depth (base) side. Furthermore, the notch portion has, for example, a two-stepped tapered shape where an opening angle at the depth side is smaller than an opening angle at the entry side. It is preferable that the taper at the depth side be formed so as to correspond to the trapezoidal form of the guide rib 21, 22 in section.

It is preferable that the guide portions provided on each of the two parts 11, 12 be offset with an interval between each other, the interval being larger than a vibration amplitude of the welding rib in a vibration-welding. In this case, both of the guide ribs 21, 22 are respectively disposed on the corresponding welding ribs 15, 16 so as to be offset at an interval 24, which is at least larger than the vibration amplitude in the vibration direction. The guide ribs 21, 22 may be disposed so as to abut with each other in a pair, or may be separately and independently disposed. In order to ensure stability, it is preferable that the guide ribs 21, 22 be disposed in a pair.

The guide ribs 21, 22 are provided on at least both end portions of the welding ribs 15, 16 or the vicinities thereof in the longitudinal directions of the welding ribs 15, 16, respectively. If the welding ribs 15, 16 have a long length, the guide ribs may be appropriately provided at positions between the end portions of the welding ribs 15, 16.

Next, operations of this embodiment will be explained.

The weld surface 14 of the welding rib 16 provided on the first part 12 and the weld surface 13 of the welding rib 15 provided on the second part 11 are positioned to contact each other and are vibrated (in the vibration direction 17), so that vicinities of the weld surfaces 13, 14 are frictionally melted to weld the weld surfaces 13, 14 together.

In this embodiment, the two parts 11, 12 to be vibration-welded are respectively provided with the welding ribs 15, 16 respectively having the weld surfaces 13, 14 corresponding to each other. The welding ribs 15, 16 are provided with the guide portions 18, 19 to guide movements of the welding ribs 15, 16 of the other side in the vibration direction 17, respectively. Consequently, the following effects can be obtained.

In a case where the two parts 11, 12 to be vibration-welded are provided with the welding ribs 15, 16, respectively, the directions of the weld surfaces 13, 14 can be easily adjusted to the vibration direction 17 (the directions of the weld surfaces 13, 14 can be set to be parallel to each other, or an angle between the directions of the weld surfaces 13, 14 can be small). Thereby, it is possible to obtain sufficient friction and to avoid a decrease of welding strength and the occurrence of failure in welding.

Furthermore, in a case where the welding ribs 15, 16 are respectively provided on the two parts 11, 12 to be vibration-welded, the heights of the welding ribs 15, 16 can be minimized to a height within approximately half of a conventional rib. Accordingly, it is possible to prevent the welding ribs 15, 16 from being deflected in the vibration-welding and to avoid the generation of sinking of the welding ribs 15, 16 during molding.

In a case where one of the welding ribs 15, 16 is provided with at least one guide portion 18, 19 to guide the welding rib of the other side, misalignment of the weld surfaces 13 and 14 or detachment (mis-contact) of the weld surfaces 13, 14 away from each other can be avoided during the vibration-welding. Thereby, it is possible to reliably perform the vibration-welding.

In a case where the guide portions 18, 19 are the guide ribs 21, 22 provided in a direction across the welding ribs 15, 16, respectively, and the guide ribs 21, 22 are disposed on the welding ribs 15, 16 with the interval 24 larger than the vibration amplitude, the following effects can be obtained.

The guide portions 18, 19 are the guide ribs 21, 22 disposed across the welding ribs 15, 16, respectively, so that the welding ribs 15, 16 are reinforced by the guide ribs 21, 22. Accordingly, it is possible to avoid the occurrence of deflection of the welding ribs 15, 16 in the vibration-welding.

If the welding ribs 15, 16 are reinforced by the guide ribs 21, 22, the thicknesses of the welding ribs 15, 16 can be minimized to avoid the generation of sinking of the welding ribs 15, 16 during molding.

In a case where the guide ribs 21, 22 have the interval 24 larger than the vibration amplitude, the guide ribs 21, 22 can be reliably prevented from interfering with each other during vibration-welding.

Although the embodiments of the present invention have been explained with reference to the drawings, the embodiments are only shown as examples, and the present invention is not limited to the configurations of the embodiments and it should be appreciated that variations may be made in the embodiments without departing from the scope of the present invention. For example, in a case where plural configurations are included in each embodiment, it should be appreciated that possible combinations of these configurations are also included, even if it is not particularly described. Furthermore, in a case where the plural embodiments and modified examples are shown, it should be appreciated that possible combinations of configurations in these embodiments and modified examples are also included, even if it is not particularly described. In addition, it should be appreciated that configurations illustrated in the drawings are also included, even if it is not particularly described.

According to an embodiment of the present invention, two parts to be vibration-welded are respectively provided with welding ribs having weld surfaces corresponding to each other, and each welding rib is provided with a guide portion capable of guiding a movement of the welding rib of the other side in a vibration direction so that the following effects can be obtained. That is, the two parts to be vibration-welded are respectively provided with the welding ribs so that the direction of the weld surfaces can be easily adjusted to the vibration direction. Accordingly, sufficient friction can be obtained and the decrease of the welding strength and the occurrence of failure in welding can be avoided. Furthermore, each of the two parts to be vibration-welded is provided with the welding rib so that the height of each welding rib can be minimized within about half of that of the conventional one. Accordingly, the occurrence of deflection of the welding rib in the vibration-welding can be avoided and the generation of sinking of the welding rib in molding can be avoided. Since the guide portion is provided on the welding rib, the occurrence of weld surfaces becoming misaligned with each other or detached from each other can be avoided in vibration-welding. Accordingly, the vibration-welding can be reliably performed.

According to an embodiment of the present invention, the guide portion is the guide rib provided on each welding rib so as to extend in a direction across each welding rib, and the guide ribs are disposed on the corresponding welding ribs, respectively, with an interval larger than the vibration amplitude so that the following effects can be obtained. That is, since the guide portions are the guide ribs disposed across the welding ribs, the welding ribs are reinforced by the guide ribs, and therefore it is possible to avoid the deflection of the welding ribs in the vibration-welding. Furthermore, since the welding ribs are reinforced by the guide ribs, the thickness of the welding rib can be minimized so that the sinking of the welding rib in molding can be avoided. In addition, the guide ribs have the interval between each other, which is larger than the vibration amplitude so that the guide ribs can be reliably prevented from interfering with each other in the vibration-welding.

The invention claimed is:

1. A vibration-weld structure comprising:
two parts including a first part and a second part, each of said two parts including a welding rib having a weld surface, said weld surface of said welding rib of said first part to be welded to said weld surface of said welding rib of said second part; and
a guide portion integrally provided on said welding rib of at least a first one of said two parts, said guide portion being configured to guide a movement of said welding rib of a second one of said two parts in a vibration direction along a longitudinal axis of said weld surface of said welding rib of said second one of said two parts;
wherein said guide portion is arranged across said welding rib of said first one of said two parts.

2. The vibration-weld structure of claim 1, wherein said guide portion comprises a first guide portion on said first part, further comprising a second guide portion on said second part.

3. The vibration-weld structure of claim 2, wherein said first guide portion and said second guide portion are arranged to be offset from each other with an interval between said first guide portion and said second guide portion, said interval being larger than a vibration amplitude of said welding rib of each of said two parts during vibration-welding.

4. The vibration-weld structure of claim 1, wherein:
said two parts are configured to be joined with each other at an angle; and
said weld surface of said welding rib of said first part is parallel to the vibration direction along the longitudinal axis of said weld surface, and said welding rib of said first part has a part-connecting surface formed at an angle relative to said weld surface, said angle being equal to a joined angle between said two parts.

5. The vibration-weld structure of claim 1, wherein:
said two parts are configured to be joined with each other at an angle; and
said weld surface of said welding rib of each of said parts is parallel to the vibration direction along the longitudinal axis of said weld surface, and said welding rib of each of said parts has a part-connecting surface formed at an angle relative to said weld surface;
a sum of the angles of said part-connecting surface of said welding rib of each of said two parts relative to said weld surface of said welding rib of each of said two parts, respectively, is equal to a joined angle between said two parts.

6. The vibration-weld structure of claim 1, wherein said welding rib of each of said two parts has a tapered trapezoidal-shaped cross-section.

7. The vibration-weld structure of claim 1, wherein said guide portion has a height larger than a height of welding rib of said first one of said two parts.

8. The vibration-weld structure of claim 1, wherein said guide portion has a notch section for receiving said welding rib of said second one of said two parts.

9. The vibration-weld structure of claim 8, wherein said notch section has a tapered shape having a broad width at an entry side and a narrow width at a depth side.

10. The vibration-weld structure of claim 8, wherein said notch section has a two-stepped tapered shape, wherein an opening angle of said notch section at a depth side is smaller than an opening angle of said notch section at an entry side.

11. The vibration-weld structure of claim 10, wherein said opening angle at said depth side corresponds to a cross-sectional shape of said welding rib of said second one of said two parts.

12. The vibration-weld structure of claim 1, wherein said guide portion is arranged across said welding rib of said first one of said two parts so as to be orthogonal with respect to said first one of said two parts.

13. A vibration-weld structure comprising:
two parts including a first part and a second part, each of said parts including a welding rib having a weld surface, said weld surface of said welding rib of said first part to be welded to said weld surface of said welding rib of said second part; and
a guide portion provided on at least a first one of said two parts, said guide portion being configured to guide a movement of said welding rib of a second one of said two parts in a vibration direction along a longitudinal axis of said weld surface of said welding rib of said second one of said two parts;
wherein said two parts are configured to be joined with each other at an angle; and
wherein said weld surface of said welding rib of said first part is parallel to the vibration direction along the longitudinal axis of said weld surface, and said welding rib of said first part has a part-connecting surface formed at an angle relative to said weld surface, said angle being equal to a joined angle between said two parts.

* * * * *